May 27, 1969     D. ENGELSMANN ET AL     3,446,130
PHOTOGRAPHIC CAMERA
Filed Nov. 24, 1965
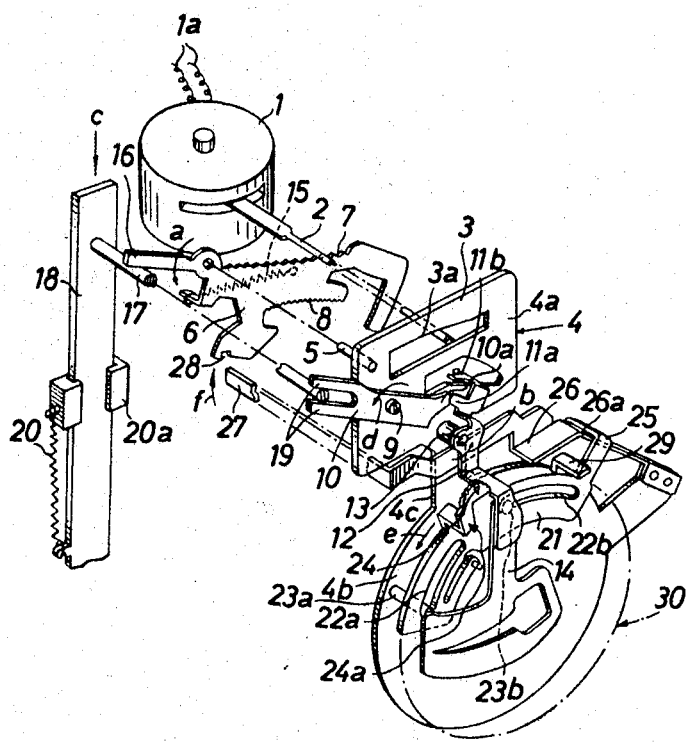
INVENTOR.
DIETER ENGELSMANN
DIETER MAAS
BY

United States Patent Office 3,446,130
Patented May 27, 1969

3,446,130
PHOTOGRAPHIC CAMERA
Dieter Engelsmann, Unterhaching, near Munich, and Dieter Maas, Munich, Germany, assignors to Agfa-Gevaert Aktiengesellschaft, Leverkusen, Germany
Filed Nov. 24, 1965, Ser. No. 514,166
Claims priority, application Germany, Dec. 4, 1964,
A 22,882
Int. Cl. G01j 1/10
U.S. Cl. 95—10    9 Claims

ABSTRACT OF THE DISCLOSURE

An exposure control wherein the needle 2 of the exposure meter if engaged by the scanning portion 7 of an arresting member 6 in response to depression of a shutter release 18 and under the action of a spring 15 which operates between the arresting member and an adjusting member 12 for the diaphragm 14. The adjusting member is allowed to engage a second portion 8 of the arresting member subsequent to engagement between the needle and the sensing portion.

---

The present invention relates to photographic cameras in general, and more particularly to an exposure control for photographic cameras with built-in exposure meter. Still more particularly, the invention relates to an exposure control of the type which is capable of automatically selecting the size of the diaphragm opening as a function of the intensity of light coming from a viewed scene or subject or which can be operated by hand to allow for manual selection of the size of the diaphragm opening.

It is an important object of the present invention to provide an exposure control which is constructed and assembled in such a way that automatic selection of the size of the diaphragm opening can take place without subjecting the indicator needle of the exposure meter to excessive bending, deflecting or other stresses.

Another object of the invention is to provide an exposure control of the just outlined characteristics which comprises a relatively small number of simple, rugged and inexpensive parts, which can automatically or manually select the size of the diaphragm opening with utmost accuracy, and which can be readily installed in many types of presently known photographic cameras.

An additional object of the invention is to provide an exposure control wherein the selection of a desired size for the diaphragm opening requires the exertion of a very small force and wherein the indicator needle of the exposure meter is automatically arrested while its position is being scanned or sensed by such part or parts which thereupon effect selection of the size of the diaphragm opening as a fuction of the momentary postion of the needle.

A further object of the invention is to provide a novel motion transmitting connection between the release trigger and the diaphragm mechanism of a photographic camera.

A concomitant object of the invention is to provide an exposure control of the above outlined characteristics wherein the conversion from automatic to manual selection of the size of the diaphragm opening can be carried out with little loss in time and wherein such part or parts which cooperate in automatic selection are automatically blocked when the user decides to select the size of the diaphragm opening by hand.

Briefly stated, one feature of our persent invention resides in the provision of an exposure control for photographic cameras, particularly for still cameras. The exposure control comprises an exposure meter including a movable indicator needle whose position is a function of the intensity of incoming light, an arresting member which preferably assumes the form of a rockable lever and is movable to and from an inoperative position, a preferably serrated, toothed or otherwise roughened sensing portion provided on the arresting member and movable into engagement with the needle on movement of the arresting member from inoperative position to thereby hold the arresting member in a selected position which reflects the intensity of incoming light, a second roughened portion provided on the arresting member and movable with the sensing portion, an adjustable diaphragm mechanism, an adjusting member movable to and from an idle position and integrally or otherwise connected with the diaphragm mechanism to select the size of the diaphragm opening, a follower provided on the adjusting member and movable into engagement with the second portion of the arresting member to thereby select the size of the diaphragm opening as a function of the intensity of incoming light, resilient means for biasing the arresting member from inoperative position and biasing the adjusting member from idle position to thereby urge the follower against the second portion of the arresting member, a manually operable release member normally assuming a starting position to thereby hold the arresting member in inoperative position, and an operative connection between the release member and the adjusting member for blocking the follower against the bias of the resilient means. The release member is movable by hand from starting position to thereby permit movement of the adjusting and arresting members under the bias of the resilient means whereby the sensing portion engages the indicator needle and the follower engages the second portion of the arresting member.

The novel features which are considered as characteristic of the invention are set forth in the appended claims. The improved exposure control itself, however, both as to its construction and the mode of adjusting and operating the same, together with additional features and advantages thereof, will be best understood upon perusal of the following detailed description of a specific embodiment with reference to the accompanying drawing the single illustration of which is an exploded perspective view of an exposure control which embodies our invention.

Referring to the drawing in detail, there is shown an exposure control for a photographic camera, preferably a still camera. This exposure control includes an exposure meter having a moving-coil instrument 1 which is built into the housing of the camera and whose coil is connected with an indicator needle 2. The needle 2 extends through a cutout 3a provided in a fixed needle stop 3. This stop 3 forms the upper part 4a of a stationary plate-like support 4. The lower part 4b of the support 4 carries a conventional shutter mechanism 30 and the two parts 4a, 4b are connected with each other by a neck portion 4c. The support 4 preferably constitutes a one-piece body which is fixedly mounted in the camera housing. Conductors 1a connect the moving-coil instrument 1 with a suitable light sensitive resistor or cell of known design which is not shown in the drawings and which causes the needle 2 to assume an angular position which is a function of the intensity of light coming from a viewed scene or subject.

The upper part 4a of the support 4 carries a pivot pin 5 which supports a rockable arresting member in the form of a lever 6, this lever having a toothed, serrated or otherwise roughened sensing or detecting portion 7 which can be moved into engagement with the needle 2 to thereby hold the needle against the adjoining portion of the fixed stop 3. The arresting lever 6 is further provided with a second serrated, toothed or otherwise roughened portion 8 which may be tracked by the follower 11b of an adjusting lever 12 serving to automatically select the size of the diaphragm opening. When the arresting lever 6 is rocked by a resilient element in the form of a helical spring 15 to turn in a counterclockwise direction (arrow a), its sensing portion 7 moves against the needle 2 and presses the latter against the fixed stop 3.

The upper part 4a of the support 4 further carries a second pivot pin 9 for a blocking lever 10 which comprises a projecting nose 10a adapted to engage a projection 11a of the adjusting lever 12, the latter being rockable about the axis of a third pivot pin 13 mounted on the upper part 4a of the support 4. The extent to which the adjusting lever 12 may be rocked by the blocking lever 10 is determined by the follower 11b which forms part of the lever 12 and is movable into abutment with the second roughened portion 8 of the arresting lever 6. The adjusting lever 12 is rigidly connected or integral with a blade 14 constituting or forming part of an adjustable diaphragm mechanism. Alternatively, the lever 12 may carry a pin which extends into the slot or slots of one or more diaphragm blades in a manner well known from the art of photographic cameras. Thus, the diaphragm mechanism may comprise two blades which are movable toward and away from each other, and the lever 12 may be coupled to one or both such blades by one or more pin-and-slot connections of known design.

The aforementioned spring 15 operates between the levers 6 and 12. As stated before, the spring 15 tends to rock the arresting lever 6 from an inoperative position in the direction of the arrow a, and the spring 15 simultaneously tends to rock the adjusting lever 12 in a counterclockwise direction (arrow b) to displace this lever from an idle position. The bias of the spring 15 causes an extension or arm 16 of the arresting lever 6 to bear against a motion transmitting rod 17 which is secured to a reciprocable release trigger 18. The rod 17 extends into an open slot defined by the bifurcated end portion 19 of the blocking lever 10 so that, when the release trigger 18 is pushed in a direction as indicated by the arrow c to leave its normal starting position, the rod 17 causes the blocking lever 10 to rock in a counterclockwise direction (arrow d). The release trigger 18 is biased by a resetting spring 20 which is secured to a fixed part 20a of the camera housing and tends to move the parts 17, 18 upwardly. The bias of the spring 20 is stronger than that of the spring 15 so that the levers 6, 10 and 12 normally remain in the positions shown in the drawing. The upper end portion of the release trigger 18 is connected with a suitable pushbutton or with another manually operated actuating element which may be manipulated by hand to displace the trigger from its starting position against the bias of the resetting spring 20.

The lower part 4b of the support 4 carries an arcuate segment-shaped converting member 21. The converting member 21 is formed with arcuate slots 22a, 22b which receive pins 23a, 23b provided on the part 4b. The converting member 21 further comprises a bent-over actuating element 24 which may be manipulated by hand to move the member 21 from an ineffective position to a selected further position such as corresponds to a selected diaphragm opening. The support 4 or another stationary member of the camera housing is preferably provided with a graduated scale (not shown) which facilitates the user's work in manually selecting a desired diaphragm opening. Thus, the converting member 21 serves as a means for manually determining a desired diaphragm opening without relying on the exposure meter. The aforementioned graduated scale further includes a graduation indicating that angular (ineffective) position which the converting member 21 must assume when the exposure control of our invention is ready to automatically select the diaphragm opening.

The converting member 21 further carries an entraining portion 25 and an abutment 29. The entraining portion 25 can move a suitably configured locking spring 26 in the form of a leaf spring which is affixed to the lower part 4b of the support 4 and carries a locking bar 27 adapted to enter a recess 28 provided in the arresting lever 6 to thereby hold the lever 6 in inoperative position against angular movement about the pivot pin 5 under the bias of the spring 15. The spring 26 is provided with an inclined cam face 26a which is shown in engagement with the entraining portion 25 of the converting member 21 to thereby hold the spring 26 in an inoperative position in which the locking bar 27 is withdrawn from the recess 28 of the arresting lever 6. The abutment 29 can limit the angular movement of the adjusting lever 12 when the camera is set for manual selection of the size of the diaphragm opening, i.e., the abutment 29 then extends into the pathway in which the lever 12 can move under the bias of the spring 15.

The drawing shows the parts of the exposure control in positions they assume when the camera is set for automatic selection of the size of the diaphragm opening. If the user decides to depress the release trigger 18 in the direction indicated by the arrow c, the motion transmitting rod 17 moves downwardly and allows the spring 15 to rock the arresting lever 6 in a counterclockwise direction as indicated by the arrow a. At the same time, the rod 17 causes the lever 10 to rock in the direction indicated by the arrow d. The photosensitive element of the exposure meter is exposed to light rays coming from the viewed scene or subject so that the indicator needle 2 is moved to an angular position which is indicative of the light intensity. As the arresting lever 6 leaves its inoperative position and rocks in response to the bias of the spring 15, its sensing portion 7 moves into engagement with the needle 2 and holds the latter against the adjoining portion of the fixed stop 3. This terminates the rocking movement of the arresting lever 6. As the blocking lever 10 rocks in the direction of the arrow d, its nose 10a releases the projection 11a of the adjusting lever 12 so that the latter can follow the bias of the spring 15 and leaves its idle position to rock in the direction indicated by the arrow b until its follower 11b reaches the roughened portion 8 of the arresting lever 6. This terminates the automatic selection of the size of the diaphragm opening because the adjusting lever 12 then maintains the diaphragm blade 14 in an angular position which is a function of the intensity of light coming from the viewed scene or subject.

The user continues to depress the release trigger 18 whereby the latter ultimately actuates the shutter mechanism 30 and the aperture of this mechanism admits light for a selected length of time. This completes the exposure and the camera is ready to take the next picture as soon as the trigger 18 is released and as soon as the film is transported by the length of a film frame.

When the trigger 18 is released, the resetting spring 20 moves it upwardly back to the starting position whereby the motion transmitting rod 17 rocks the blocking lever 10 in a clockwise direction and simultaneously engages the arm 16 to thereby return the arresting lever 6 to the inoperative position which is shown in the drawing. The sensing portion 7 of the arresting lever 6 releases the needle 2 so that the latter is again free to assume an angular position which may but need not be the same as during the preceding exposure, depending on the intensity of light which impinges against the photosensitive element of the exposure meter. The blocking lever 10 causes its nose 10a to engage the projection 11a and to return the adjusting lever 12 to the idle position in which the diaphragm blade 14 preferably (but not necessarily) defines an opening of maximum size.

If the size of the diaphragm opening is to be selected by hand, the user will proceed as follows:

The actuating element 24 of the segment-shaped converting member 21 is moved by hand until a marker 24a on the element 24 registers with a selected graduation on the aforementioned scale. During such angular movement of the converting member 21 from its ineffective position, the entraining portion 25 moves away from the cam face 26a of the leaf spring 26 so that the latter is released and moves its locking bar 27 into the recess 28 of the arresting lever 6, i.e., this arresting lever is now locked and cannot follow the bias of the spring 15 when the motion transmitting rod 17 moves downwardly in response to depression of the release trigger 18. The direction in which the locking bar 27 moves when the entraining portion 25 moves away from the cam face 26a of the spring 26 is indicated by an arrow f. As the converting member 21 continues to move in the direction indicated by the arrow e, the abutment 29 moves into the path of the adjusting lever 12, i.e., into that path in which the lever 12 can move when the release trigger 18 is depressed.

The trigger 18 is then depressed against the bias of the spring 20 (arrow c) whereby the arresting lever 6 remains in the illustrated inoperative position because it is locked by the bar 27 of the spring 26. The rod 17 rocks the blocking lever 10 in the direction indicated by the arrow d whereby the nose 10a releases the projection 11a so that the adjusting lever 12 can follow the bias of the spring 15 and moves into engagement with the abutment 29 of the converting member 21. Thus, the size of the diaphragm opening now corresponds to that which is selected manually by the setting of the converting member 21 and, on full depression of the trigger 18, the latter actuates the shutter mechanism 30 to make an exposure.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In an exposure control for photographic cameras, an exposure meter comprising a movable indicator whose position is a function of the intensity of incoming light; an arresting member movable to and from an inoperative position and having a sensing portion movable into engagement with said indicator on movement of said arresting member from inoperative position to thereby hold the arresting member in a selected position which reflects said intensity, said arresting member having a second portion which is movable with said sensing portion; an adjustable diaphragm mechanism; an adjusting member movable to and from an idle position and operatively connected with said diaphragm mechanism for selecting the size of the diaphragm opening, said adjusting member having a follower movable into engagement with the second portion of said arresting member to thereby select the size of the diaphragm opening as a function of said intensity; resilient means for biasing said adjusting member from said idle position to move said follower against the second portion of said arresting member and for biasing said sensing portion against said indicator; a movable release member normally assuming a starting position to thereby hold said arresting member in inoperative position; and an operative connection between said release member and said adjusting member for blocking said follower against the bias of said resilient means, said release member being movable from said starting position to thereby permit movement of said adjusting and arresting members under the bias of said resilient means whereby said sensing portion engages the indicator and the follower engages the second portion of said arresting member.

2. A structure as set forth in claim 1, wherein each of said arresting and adjusting members constitutes a rockable lever and wherein said resilient means comprises a spring coupling said levers.

3. A structure as set forth in claim 1, wherein the operative connection between said release member and said adjusting member comprises a blocking member normally blocking said adjusting member against movement from said idle position, and motion transmitting means provided on said release member for disengaging said blocking member from said adjusting member on movement of said release member from starting position.

4. A structure as set forth in claim 1, wherein said resilient means operates between said arresting member and said adjusting member.

5. In an exposure control for photographic cameras, an exposure meter comprising a movable indicator whose position is a function of the intensity of incoming light; an arresting member movable to and from an inoperative position and having a sensing portion movable into engagement with said indicator on movement of said arresting member from inoperative position to thereby hold the arresting member in a selected position which reflects said intensity, said arresting member having a second portion which is movable with said sensing portion; an adjustable diaphragm mechanism; an adjusting member movable member to and from an idle position and operatively connected with said diaphragm mechanism for selecting the size of the diaphragm opening, said adjusting member having a follower movable into engagement with the second portion of said arresting member to thereby select the size of the diaphragm opening as a function of said intensity; resilient means for biasing said adjusting member from said idle position to move said follower against the second portion of said arresting member and for biasing said sensing portion against said indicator; a movable release member normally assuming a starting position to thereby hold said arresting member in inoperative position; an operative connection between said release member and said adjusting member for blocking said follower against the bias of said resilient means, said release member being movable from said starting position to thereby permit movement of said adjusting and arresting members under the bias of said resilient means whereby said sensing portion engages the indicator and the follower engages the second portion of said arresting member; and a manually operated converting member operatively connectable to said adjusting member and movable from an ineffective position to a plurality of further positions each of which corresponds to a different size of said diaphragm opening, said converting member being moved to said ineffective position when said resilient means is free to move said arresting member on movement of said release member from starting postion.

6. A structure as set forth in claim 5, further comprising a locking member having a locking portion movable into locking engagement with said arresting member to hold the latter in said inoperative position, said converting member comprising an entraining portion arranged to disengage said locking portion from said arresting member in response to movement of said converting member to ineffective position.

7. A structure as set forth in claim 5, wherein said converting member comprises an abutment which is engaged by a portion of and thereby arrests said adjusting member when the latter is free to follow the bias of said resilient means subsequent to movement of said converting member from ineffective position to one of said further positions.

8. A structure as set forth in claim 5, further comprising a fixed support, said converting member being rotatably mounted on said support.

9. A structure as set forth in claim 8, further comprising a shutter mechanism operatively connected with said release member, said shutter mechanism, said adjusting member and said arresting member being mounted on said support.

References Cited

UNITED STATES PATENTS

| 3,038,399 | 6/1962 | Morelle | 95—10 |
| 3,276,338 | 10/1966 | Singer | 95—10 |

FOREIGN PATENTS

| 873,081 | 7/1961 | Great Britain. |
| 7,841 | 6/1963 | Japan. |

NORTON ANSHER, *Primary Examiner.*

JOSEPH F. PETERS, JR. *Assistant Examiner.*

U.S. Cl. X.R.

95—64